United States Patent [19]

Nagahama

[11] Patent Number: 5,801,969

[45] Date of Patent: Sep. 1, 1998

[54] METHOD AND APPARATUS FOR COMPUTATIONAL FLUID DYNAMIC ANALYSIS WITH ERROR ESTIMATION FUNCTIONS

[75] Inventor: Yoshinori Nagahama, Kawasaki, Japan

[73] Assignee: Fujitsu Limited, Kawasaki, Japan

[21] Appl. No.: 622,002

[22] Filed: Mar. 26, 1996

[30] Foreign Application Priority Data

Sep. 18, 1995 [JP] Japan ................................ 7-238685

[51] Int. Cl.$^6$ .................................................. G06F 9/455
[52] U.S. Cl. .................................................. 364/578
[58] Field of Search ................................ 364/578, 510; 395/183; 73/152.18

[56] References Cited

U.S. PATENT DOCUMENTS

| | | | |
|---|---|---|---|
| 4,534,003 | 8/1985 | Manzione | 364/476 |
| 5,367,470 | 11/1994 | Lang | 364/498 |
| 5,402,333 | 3/1995 | Cardner | 364/151 |
| 5,504,692 | 4/1996 | Cardner | 364/500 |

OTHER PUBLICATIONS

Aeschliman et al. "A Proposed Methodology for Computational Fluid Dynamics Code Verification, Calibration, and Validation," 1995, ICIASF '95: Instrumentation in Aerospace Simulation Facilities. pp. 27.1–27.13.

Zhong et al. "Robust and Physically–Constrained Interpolation of Fluid Flow Fields." 1992. ICASSP'92: Acoustics, Speech & Signal Processing Conference. pp. III–185–III–188.

Abstract of Japanese Patent Application Laid–Open Publication No. 6–195425, issued Jul. 15, 1994.

*Primary Examiner*—Kevin J. Teska
*Assistant Examiner*—Dan Fiul
*Attorney, Agent, or Firm*—Staas & Halsey

[57] ABSTRACT

A method of and apparatus for performing error estimation for a computational fluid dynamic analysis, which quantitatively indicates an error involved in the computational solutions. Virtual substance advection calculation means performs an advection computation, assuming that a virtual substance whose diffusion coefficient is substantially zero is mixed in the fluid, wherein the behavior of the fluid is given by flow field data that is previously obtained as a result of the computational fluid dynamic analysis. Through the advection computation, the virtual substance advection calculation means obtains concentration data of the virtual substance, thus allowing an error in the flow field data to be estimated by comparing the concentration value after advection of the virtual substance with its initial value. If the flow field data perfectly satisfies the primitive equations of fluid dynamics, the concentration value of the virtual substance will not vary with advection. In contrast, if the flow field data violated the primitive equations, the concentration value obtained by the advection computation would show some variation. This variation enables the error in the flow field data to be quantified.

8 Claims, 12 Drawing Sheets

$t = t_S^C$ $C_{ij}(t_S^C)$ $t = t\{\frac{1}{2}(t_S^C + t_E^C)\}$ $C_{ij}\{\frac{1}{2}(t_S^C + t_C^E)\}$ $t = t_E^C$ $C_{ij}(t_E^C)$

METHOD AND APPARATUS FOR COMPUTATIONAL FLUID DYNAMIC ANALYSIS WITH ERROR ESTIMATION FUNCTIONS

BACKGROUND OF THE INVENTION

1. Field of the Invention

The present invention relates to a method of and apparatus for performing error estimation in a computational fluid flow analysis that numerically simulates the behavior of heat or fluid, and to a method of and apparatus for performing fluid flow analysis with an error estimation function. More specifically, the present invention relates to a method of and apparatus for performing error estimation directly from flow field data in computational fluid dynamic analysis, and to a method of and apparatus for computational fluid dynamic analysis that calculate an error in the flow field data yielded by themselves.

2. Description of the Related Art

Design verification by experiment and engineering approaches on a trial-and-error basis have long been indispensable processes in the development of modern automobiles, vessels, aircraft, and buildings to obtain a better aerodynamic performance, higher thermal efficiency and/or more excellent cooling capability. However, the advancement of computer technologies in recent years has caused great expectations for computer-aided analyses in thermodynamics and fluid dynamics, and they are now getting popularized as a strong tool to reduce the design costs and shorten the development time by replacing conventional experimental work with computer simulations.

A fluid flow analysis calculates flow velocities and pressure values at predetermined nodal points, using some governing rules called "primitive equations" as:

(a) equation of continuity, representing the conservation law of mass of fluid;

(b) equation of motion, representing the conservation law of momentum of fluid (known as the Navier-Stokes equation, specifically applicable to viscous fluid); and (c) energy equation, representing the conservation law of energy of fluid.

Here arises a request for a positive proof ensuring that such computer simulations can take the place of physical experiments with high accuracy. For this purpose the results of the thermodynamic and/or fluid dynamic analysis should be clarified in their degree of confidence.

The errors involved in a solution of numerical simulation of thermodynamics or fluid dynamics are roughly classified into two types: a modeling error and a computational error. It is necessary to estimate the magnitude of those two kinds of errors in the solution.

The modeling error is introduced through a discretization process of the primitive equations to obtain a computational model. That is, a fluid dynamics system is divided into discrete grids for computation purposes. Flow velocity and other physical quantities are calculated only at those nodal (grid) points. This discretization must cause an error to some extent unless the grid distances are infinitely reduced to zero. Another problem is that the grids are not always defined in the Cartesian coordinate system, but instead, a curvilinear coordinate system may be actually used. If this is the case, deformation of each unit cell can introduce another kind of error.

The computational error, on the other hand, derives from restrictions of the significant digits that computers can support, or from truncation of a computation process when iterative methods are used to calculate a solution. That is, due to a limited number of significant digits, computers omit fractions below the least significant digit in each arithmetic operation, and the iterative operations will cause this error to be accumulated. In the iterative methods in numerical analysis, a rough estimate is first given and then the solution will converge to a true value step by step. In reality, however, the calculation should be stopped after some finite times of iteration, thereby resulting in an inevitable error remaining in the solution to some extent.

However, it is quite difficult, or impossible in a practical sense, to evaluate how the computational error will affect the obtained physical quantities, because the number of calculation steps required in computational fluid dynamics is too enormous in general. In contrast, the modeling error can be estimated by using some appropriate error evaluation functions.

For example, there is a method to deal with the modeling error by using the Jacobian determinant as an error evaluation function. This method can be applied to the cases that the system is described in a curvilinear coordinate system obtained through a generalized coordinate system transformation. That is, the Jacobian determinant of the coordinate transformation matrix for each unit cell is calculated for error estimation. If the calculated value of the Jacobian is close to "1", it indicates that the unit cell is near cubic. In contrast to this, the Jacobian being far from "1" implies that the unit cell is deformed far from a true cube. Therefore, a larger error is expected at the position where the Jacobian is off the value "1," while a less error is estimated where the Jacobian is close to "1." The modeling error can be evaluated in that way.

However, the evaluation of the modeling error involves the following potential problems.

First of all, it is extremely difficult in general to properly define an error evaluation function required for each step of modeling and approximation.

The second problem is a difficulty in finding an error evaluation function that quantitatively reflects the true error value, although it is relatively easy to see a qualitative correlation between them. Returning to the aforementioned method that uses the Jacobian determinant for error evaluation, the method will suggest a large error for the places where the Jacobian is far from "1," however, it does not exactly guarantee that the error is always small where the Jacobian is close to "1."

Furthermore, even if the modeling errors were successfully estimated, the computational errors would still remain unsolved. As a matter of fact, there has been no such a way that can totally assess the accuracy of computational solutions of fluid flow analysis.

For the reasons described above, it has been very hard for the operator to decide whether he/she should retry the analysis or not, changing the grid setting or analytical models, unless the obtained computational solution looks apparently incorrect. To make a decision to accept the computational solution in such a situation, there is no other way for the operator than comparing it with another data obtained through a different modeling scheme, increased computation precision, similar analysis that is previously performed, or physical experiment.

As discussed above, a quantitative expression of the computational error is indispensable for evaluating the degree of confidence of the solutions obtained by fluid dynamic analysis. This error quantification will also permit the operator to select a method of analysis more suitable for each approach of experiment, as well as providing objective criteria for reviewing the solutions.

SUMMARY OF THE INVENTION

Taking the above into consideration, an object of the present invention is to provide a method of quantitatively estimating an error in fluid flow analysis.

Another object of the present invention is to provide an apparatus for quantitatively estimating an error in fluid flow analysis.

Still another object of the present invention is to provide a method of fluid flow analysis that can quantitatively indicate an error contained in its computational solution.

A further object of the present invention is to provide an apparatus for fluid flow analysis that can quantify an error contained in its computational solution.

To accomplish the first object, according to the present invention, there is provided a method of performing error estimation to evaluate a solution of a computational fluid dynamic analysis that numerically simulates behavior of heat and/or fluid. The method comprises the steps of: obtaining concentration data of a virtual substance whose diffusion coefficient is substantially zero, through an advection computation assuming that the virtual substance is mixed in the fluid described by flow field data obtained from the computational fluid dynamic analysis; and estimating an error in the flow field data based on variation in a concentration value of the virtual substance detected by comparing the concentration data with an initial value thereof.

To accomplish the other objects, there is also provided an apparatus for performing error estimation to evaluate a solution of a computational fluid dynamic analysis that numerically simulates behavior of heat and/or fluid. This apparatus comprises virtual substance advection calculation means for obtaining concentration data of a virtual substance whose diffusion coefficient is substantially zero, through an advection computation assuming that the virtual substance is mixed in the fluid described by flow field data obtained as a result of the computational fluid dynamic analysis.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

An embodiment of the present invention will be described below with reference to the drawings.

Figure 1:
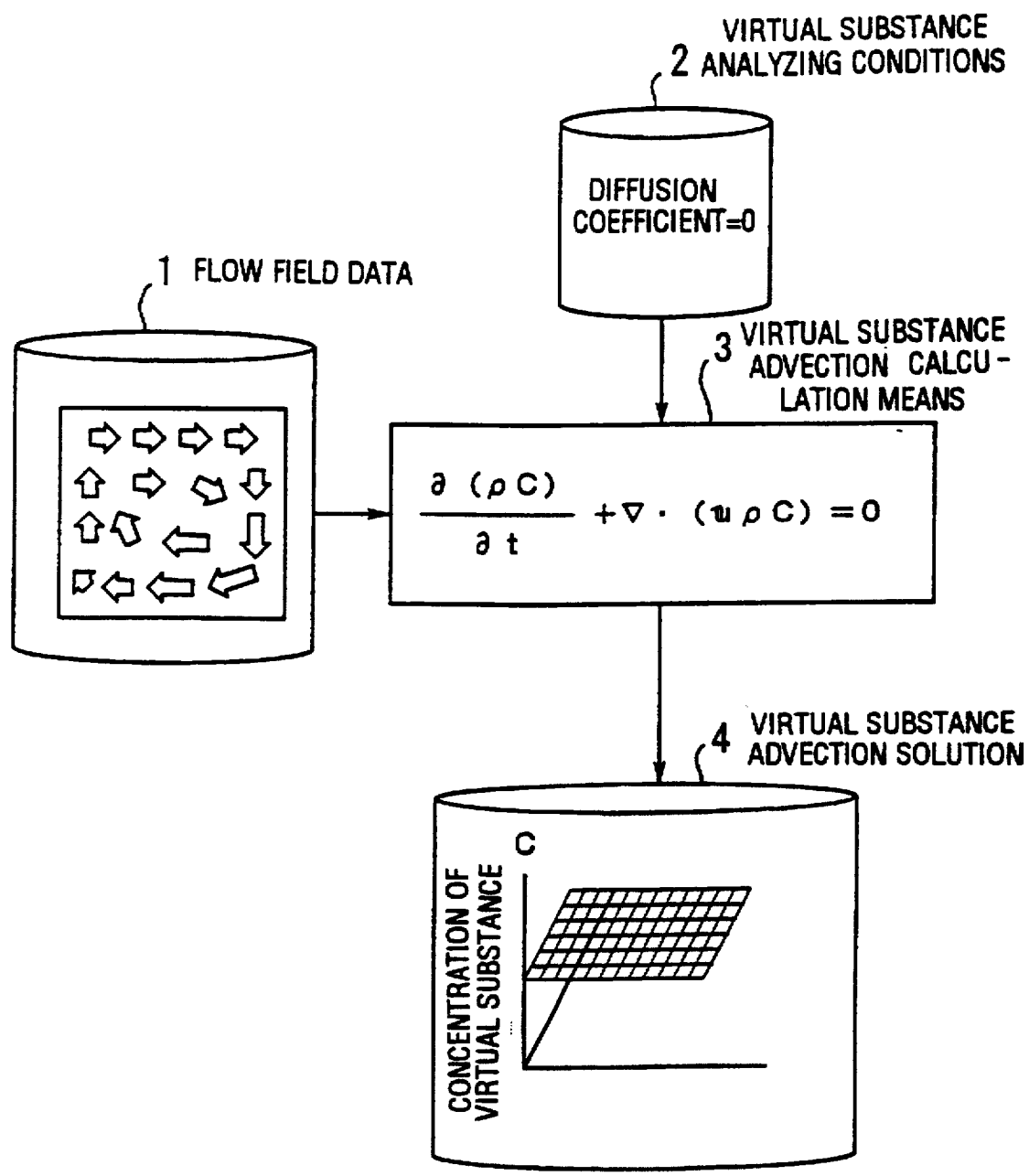
FIG. 1 is a conceptual view of a method of and apparatus for performing error estimation to evaluate a solution of computational fluid dynamic analysis according to the present invention.

FIG. 1 shows a conceptual view of a method of and apparatus for performing error estimation to evaluate a solution of computational fluid dynamic analysis according to the present invention.

First, flow field data 1 is obtained as a result of the computational fluid dynamic analysis. This flow field data 1 generally contains various information in the flow field such as time, definition points of each component of the fluid flow, and values of respective flow vectors. The time information, however, may be omitted when the problem under discussion is time-independent as is a steady state problem. Also, the definition points for each component of the fluid flow may not be necessarily involved in the flow field data 1 if virtual substance analyzing conditions 2 provides enough information to arrange and define them derivatively. Further, it is not always necessary to provide all the data at a time, but it is allowed to supply them on demand, in which case operation of virtual substance advection calculation means 3 will be suspended until the necessary data becomes ready.

Next, the virtual substance analyzing conditions 2 is provided, assuming the presence of virtual substance. The term "virtual substance" introduced here stands for an imaginary substance whose diffusion coefficient is zero. It is assumed that such a virtual substance is uniformly mixed in the fluid given in the flow field data 1. However, the concept of the virtual substance allows the diffusion coefficient not always to be exact zero. It will be also acceptable if the diffusion coefficient value is much smaller than that of ordinary substances existing in the real world.

The virtual substance analyzing conditions 2 contains all information necessary for advection computation of the virtual substance to be performed by the virtual substance advection calculation means 3. Specifically, the conditions includes: grid division data including coordinates and sequence of grid points; selection of time integral scheme such as Euler's explicit method, Euler's implicit method, or RRK (Rational Runge-Kutta) method; selection of differencing scheme for the advective term such as the first-order upwind scheme, second-order central scheme, or third-order upwind scheme; initial conditions; boundary conditions; computation start time; computation end time or computation end step; time step; and methods of outputting computational solutions. Some of the information can be omitted if they are provided in the flow field data 1.

Similarly to the aforementioned flow field data 1, it is not always necessary to provide all those data at a time, but it is allowed to supply them on demand, in which case the operation of the virtual substance advection calculation means 3 will be suspended until the necessary data becomes ready.

With the flow field data 1 and virtual substance analyzing conditions 2, the virtual substance advection calculation means 3 performs advection computation regarding the virtual substance and the fluid. The fundamental equation used to calculate the advection is an advection equation that represents the transport of the virtual substance by the fluid as $$\frac{\partial(\rho C)}{\partial t} + \nabla \cdot (u\rho C) = 0, \quad (1)$$

where t is time, ρ is density of the fluid, vector U is the flow velocity, and C is the concentration of the virtual substance.

That is, the sum of partial derivative of the virtual substance concentration with respect to time and divergence of a concentration flux of the virtual substance equals to zero, where the concentration flux denotes the product of the virtual substance concentration and the flow velocity. This Equation (1) represents the conservation law of mass regarding the virtual substance, and its physical interpretation is that the variation in quantity of the virtual substance at a certain place is equal to the difference between those brought into the place from somewhere else and those carried away to somewhere by the fluid flow. In reality, however, any substances will diffuse due to their molecular motion, and therefore, their behavior is expressed not by a simple advection equation but by an advection-diffusion equation taking the effect of diffusion into account.

The advection equation of the virtual substance can be numerically solved using just the same computational method as that applied to the advection-diffusion equation for real substances. This advection-diffusion equation actually is much simpler in structure than the Navier-Stokes equation, which is known as the equation of motion applicable to viscous fluid. Thus the engineers well skilled in the programming of fluid flow analysis will be able to solve the problem easily. As a matter of fact, there are several publications that describe the computational methods to solve the above-mentioned equations. For example, the finite difference methods to solve the advection-diffusion equation are provided in chapter 13 of "General-Purpose Fluid Dynamics Analyzing System FUJI-RIC/α-FLOW", by Fuji Research Institute Corporation, Maruzen Co., Ltd., Japan (1993).

As a result of numerical calculations for the advection equation, the virtual substance advection calculation means 3 outputs a virtual substance advection solution 4 which contains concentration data of the virtual substance at the predetermined grid points. If the flow field data 1 satisfies the primitive equations, the concentration of the virtual substance should be consistent with the initial value due to its non-diffusive property. In other words, the concentration value at each grid point, if it has been far varied from the initial value, suggests that the flow field data 1 does not satisfy the physical laws concerning the fluid.

In the way described above, the accuracy of the computational fluid dynamic analysis performed to obtain the flow field data 1 can be quantitatively evaluated by examining the concentration data of the virtual substance at the grid points. Further, by utilizing the fluid flow analyzing conditions that has been used for calculation of the flow field data, the present invention can also be carried out in the following mode.

Figure 2:
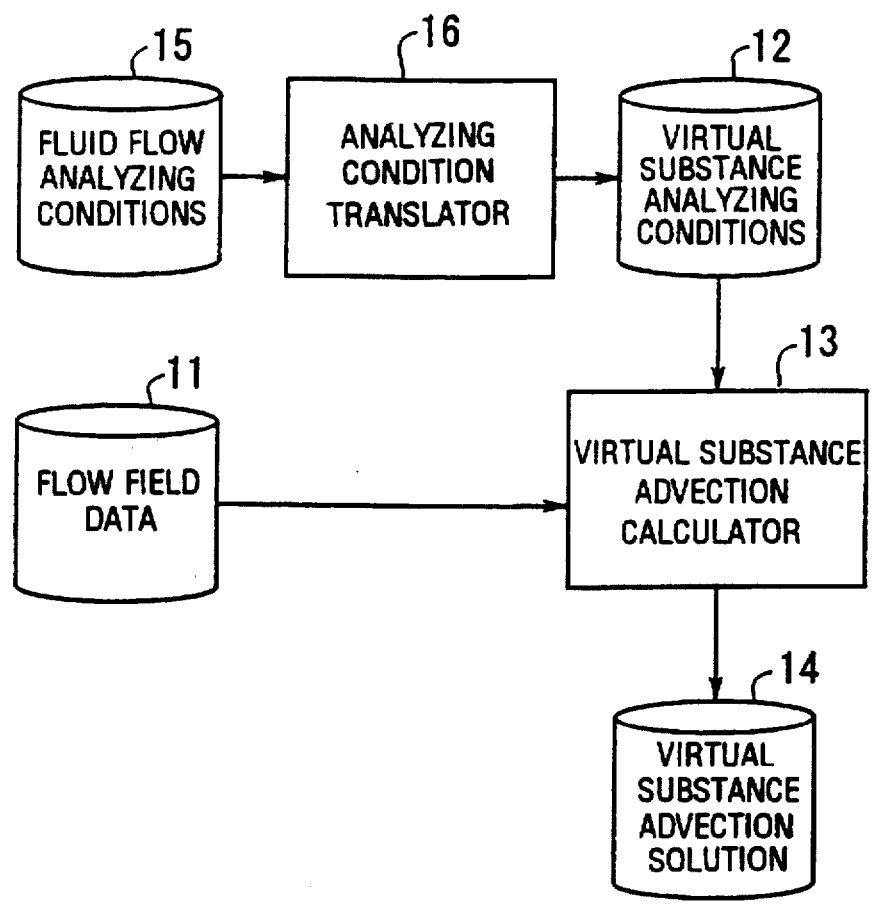
FIG. 2 is a diagram showing an apparatus for performing a computational fluid dynamic analysis which sets virtual substance analyzing conditions using fluid flow analyzing conditions.

FIG. 2 is a block diagram showing an apparatus for performing error estimation to evaluate a solution of computational fluid dynamic analysis which sets the virtual substance analyzing conditions using the fluid flow analyzing conditions. This configuration is based on the structure shown in FIG. 1, however, an analyzing condition translator 16 is newly added thereto so as to set a part of or all the virtual substance analyzing conditions 12 deriving from fluid flow analyzing conditions 15.

The fluid flow analyzing conditions 15 are data originally used for the computational fluid dynamic analysis to obtain the flow field data 11, and naturally, it covers all the information necessary for calculations of the flow field data 11. More specifically, the fluid flow analyzing conditions 15 includes the following information: grid division data including coordinates and sequence of grids; optional selection of whether the energy equation is solved or not; selection of a turbulence model; various constants in the model; designation of computational parameters; selection of time integral scheme such as Euler's explicit method, Euler's implicit method, or RRK method; selection of differencing scheme applied to the advective term, such as the first-order upwind scheme, second-order central scheme, or third-order upwind scheme; initial conditions; boundary conditions; computation start time; computation end time or computation end step; time step; and method of outputting the computational solutions.

The analyzing condition translator 16 extracts necessary data from the fluid flow analyzing conditions 15 and sets the virtual substance analyzing conditions 12 automatically. The scope of this automatic setting may be limited to a certain part of the virtual substance analyzing conditions 12 or can be all of them. For the purpose of automatic translation from the fluid flow analyzing conditions 15 to the virtual substance analyzing conditions 12, several translation rules are defined in advance and set into the analyzing condition translator 16.

The fluid flow analyzing conditions 15 may contain some unnecessary data, but it is just harmless because the analyzing condition translator 16 will never output such irrelevant data without corresponding translation rules defined therein. When the fluid flow analyzing conditions 15 completely includes the virtual substance analyzing conditions 12, the former provides the latter with only the necessary data. In contrast, when the fluid flow analyzing conditions 15 lacks some data necessary for the virtual substance analyzing conditions 12, the analyzing condition translator 16 can provide predetermined default values for such data.

The following description will explain what kind of specific data the analyzing condition translator 16 will output as the virtual substance analyzing conditions 12.

The coordinates of the grid points and their sequence can be just duplicated from the fluid flow analyzing conditions 15 to the virtual substance analytical conditions 12.

The initial value of the concentration of the virtual substance can be set unconditionally to "1" or derived from fluid density data available in the fluid flow analyzing conditions 15.

For the boundary conditions regarding the virtual substance, its gradient may be unconditionally set to zero. Alternatively, if the fluid flow analyzing conditions 15 contains a designation of in-coming flow speed, the concentration value of the virtual substance can be fixed to "1" or set equal to the density of the fluid.

The computation start time, computation end time, computation ending step, time step, etc. in the virtual substance analyzing conditions 12 are programmed partly or totally the same as those specified in the fluid flow analyzing conditions 15. Those timing parameters, however, can take arbitrary values and are not necessarily set to the same values.

For example, the computation start time can be defined as "0" or set equal to the computation end time specified in the fluid flow analyzing conditions 15.

The output time setting for the calculated concentration data may be set to the final time of computation or adjusted to the output time of physical quantities set in the fluid flow analyzing conditions 15.

As to the scheme selections in the virtual substance analyzing conditions 12 such as the time integral scheme and differencing scheme for the advective term, the setting values can be partly or totally the same as those specified in the fluid flow analyzing conditions 15. Alternatively, it is also possible to predetermine some appropriate rules that associate the fluid flow analyzing conditions 15 with the virtual substance analyzing conditions 12. Assume here that the fluid flow analyzing conditions 15 accepts four kinds of differencing schemes for the advective term. They are, for instance, the first-order upwind scheme, the second-order central scheme, the third-order upwind scheme, and the QUICK scheme. Then, in the virtual substance analyzing conditions 12, the schemes associated therewith will be the first-order upwind scheme, the second-order central scheme, the third-order upwind scheme, and the third-order upwind scheme, respectively. There is no need to associate the same type of schemes with each other, but a 1-to-N association of schemes are rather acceptable as described in this example.

A virtual substance advection calculator 13 calculates the advection of the virtual substance by the fluid to produce a virtual substance advection solution 14, which contains the concentration data for the virtual substance at the predefined grid points. Note that the virtual substance advection calculator 13 in FIG. 2 actually provides the same function as that of the virtual substance advection calculation means 3 in FIG. 1, although the term "means" is not used. This type of renaming will appear again in other structural arrangements to be introduced later.

As clarified above, many of the setting data in the virtual substance analyzing conditions 12 are common to the fluid flow analyzing conditions 15. The analyzing condition translator 16, which translates data from the latter to the former, will make it easier to set up the virtual substance analyzing conditions 12.

The above-described error estimation functions can be applied to a computational fluid dynamics analyzer that calculates the flow field data.

Figure 3:
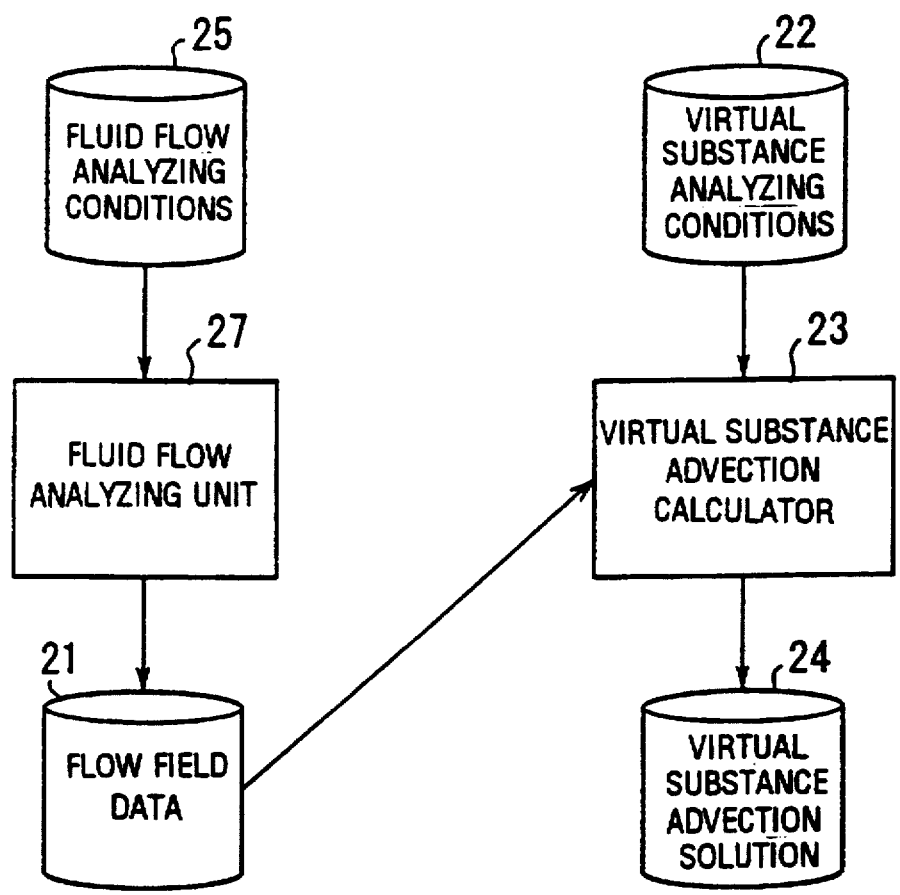
FIG. 3 is a conceptual view of a method of and apparatus for performing a computational fluid dynamic analysis according to the present invention.

FIG. 3 is a conceptual view of a method of computational fluid dynamic analysis and a computational fluid dynamics analyzer according to the present invention. A fluid flow analyzing unit 27 outputs flow field data 21 based on fluid flow analyzing conditions 25. The primitive equations used for calculation of the flow field data 21 are shown below.

(a) Equation of continuity representing the conservation low of mass as $$\frac{\partial \rho}{\partial t} + \nabla \cdot (\rho u) = 0 \qquad (2)$$

(b) Equation of motion as $$\frac{\partial}{\partial t}(\rho u) + \nabla \cdot (u \rho u) = -\nabla P + \nabla \cdot \tau \qquad (3)$$

where P is the pressure and T is the Reynolds stress tensor.

(c) Equation representing the conservation low of energy as $$\frac{\partial e}{\partial t} + \nabla \cdot (u(e+P)) = \nabla \cdot (\tau \cdot u) - \nabla q \qquad (4)$$

where e is the total energy and vector q represents the heat flux vector. The flow velocity vector u and pressure will be calculated from the above primitive equations. Incidentally, when the fluid is non-compressive (i.e., its density is regarded as constant), the energy equation (4) is not necessary for the computation.

For practical implementation of the fluid flow analyzing unit 27, many general-purpose analyzer programs are commercially available today. The FUJITSU/αFLOW from Fujitsu LTD, Japan, is one of such programs. There are also a number of useful publications regarding the fluid dynamics analysis. For example, methods of structuring programs for the fluid dynamics analysis are well described in "General-Purpose Fluid Dynamics Analyzing System FUJI-RIC/αFLOW," by Fuji Research Institute Corporation, Maruzen Co., Ltd., Japan (1993).

As to the data to be set in the fluid flow analyzing conditions 25, it is not always necessary to supply all the data at a time. It is allowed to partly provide them on demand, and in that case, the operations of the fluid flow analyzing unit 27 will be suspended until the necessary data becomes ready.

Using the flow field data 21, a virtual substance advection calculator 23 calculates the advection of the virtual substance under virtual substance analyzing conditions 22, and finally outputs its result as a virtual substance advection solution 24.

By integrating the error estimation functions into the apparatus for computational fluid dynamics analysis in the way described above, the computation of the flow field data 21 and its error estimation are seamlessly carried out in a single process, thereby permitting the operator to obtain simultaneously the flow field data and the evaluation data which quantitatively shows its accuracy level.

Figure 4:
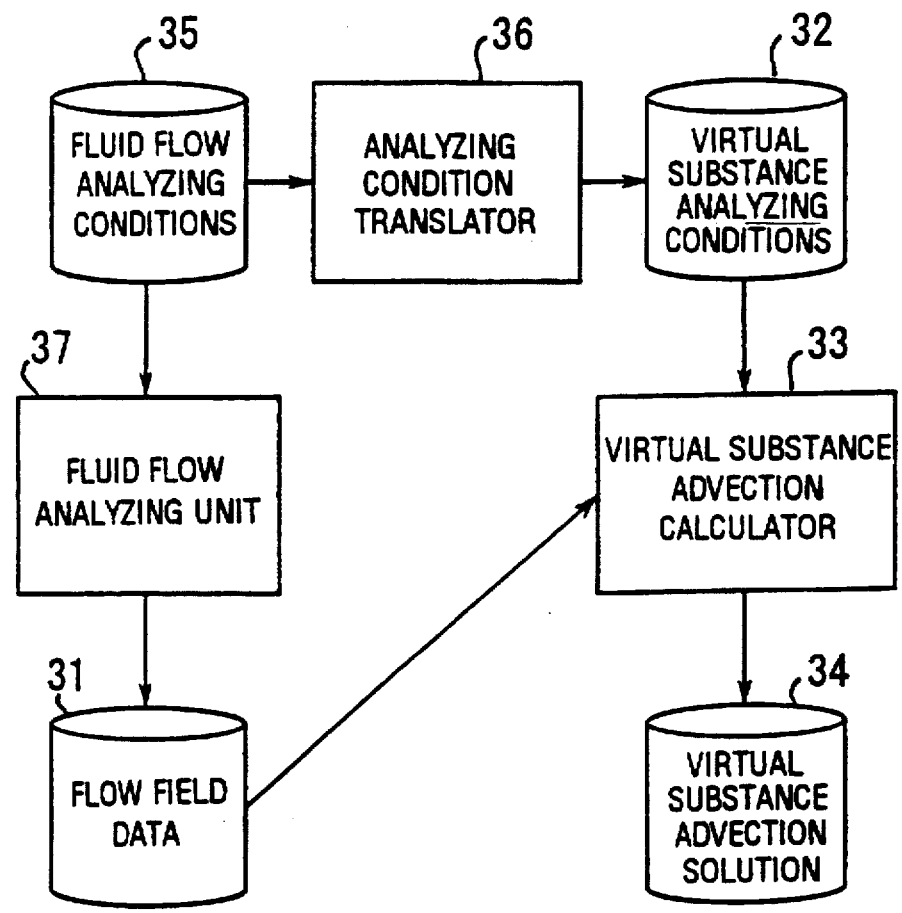
FIG. 4 is a diagram showing an apparatus for performing a computational fluid dynamic analysis having a function of translating the analyzing conditions.

FIG. 4 shows a computational fluid dynamics analyzer having a function of translating the analyzing conditions. A fluid flow analyzing unit 37 calculates flow field data 31 based on fluid flow analyzing conditions 35. On the other hand, an analyzing condition translator 36 automatically sets virtual substance analyzing conditions 32, extracting necessary data for it from the fluid flow analyzing conditions 35. A virtual substance advection calculator 33 calculates the advection of the virtual substance according to the flow field data 31 and outputs a virtual substance advection solution 34.

As described above, the analyzing condition translator 36 integrated in the computational fluid dynamics analyzer shown in FIG. 3 makes it easy to set up the virtual substance analyzing conditions 32. The operator only has to set the fluid flow analyzing conditions 35, and he/she will obtain both the flow field data and evaluation data that quantitatively shows its accuracy level.

The following description will now explain more specifically about a process of obtaining the flow field data of non-compressive fluid and estimating errors in the obtained data using the computational fluid dynamics analyzer shown in FIG. 4.

Figure 5:
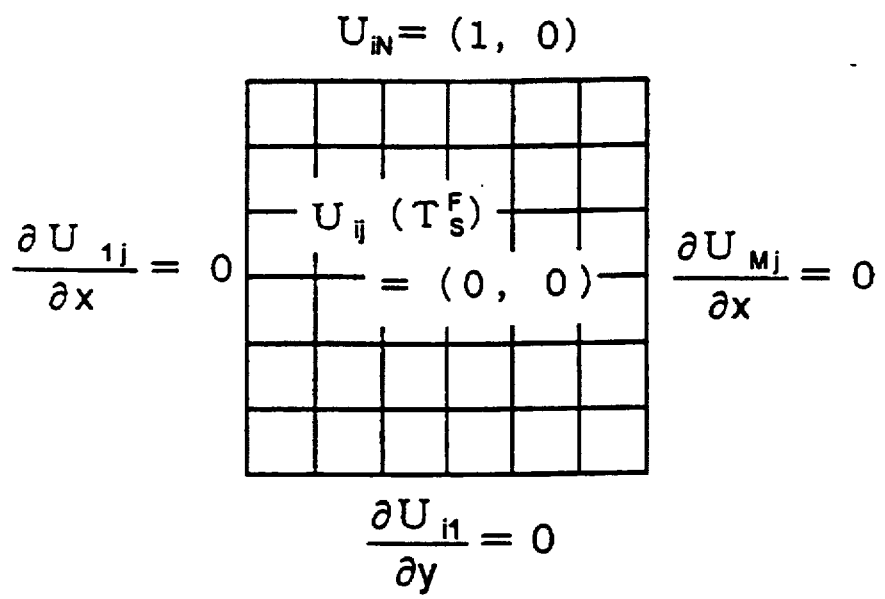
FIG. 5 is a diagram showing boundary conditions and initial conditions included in the fluid flow analyzing conditions.

At the outset, the fluid flow analyzing conditions should be set. The subject of the analysis is a flow problem in a two-dimensional square region. This square region, or computational domain, is divided into M×N cells, where M is the number of cells in the X-axis direction and N in the Y-axis direction. FIG. 5 show boundary and initial conditions included in the fluid flow analyzing conditions.

The initial value of flow velocity U is defined as $$U_{ij}(T_s^F) = (0,0) \quad (5)$$

This initial condition means that the flow velocity at the interior grid points is zero at the computation start time.

The boundary conditions are given as $$\frac{\partial U_{1j}}{\partial x} = 0 \quad (6)$$

$$\frac{\partial U_{i1}}{\partial y} = 0 \quad (7)$$

$$\frac{\partial U_{Mj}}{\partial x} = 0 \quad (8)$$

$$U_{iN} = (1, 0) \quad (9)$$

Equation (6) indicates that the spatial derivative (i.e., gradient) of the flow velocity $U_{1j}$ at every first grid in the X-axis direction is zero. Equation (7) indicates that the gradient of the flow velocity $U_{Mj}$ at every M-th grid in the X-axis direction is zero. Equation (8) indicates that the gradient of the flow velocity $U_{i1}$ at every first grid in the Y-axis direction is zero. Equation (9) indicates that the flow velocity $U_{iN}$ at every N-th grid in the Y-axis direction fixedly points in the X-axis direction and its absolute value is "1."

The computation start time, computation end time, and time step are defined as $$T_s^F = t_s^F \quad (10)$$

$$T_E^F = t_E^F \quad (11)$$

$$\Delta T^F = \Delta t^F \quad (12)$$

where $t_s^F$, $t_E^F$, and $\Delta t^F$ can take arbitrary values.

Further, the time integral scheme is set as $$TH_{INTEGRAL}^F = EULER \quad (13)$$

where the term "EULER" indicates the use of Euler's explicit method for the time integration.

The differencing scheme for the advective term is selected as $$TH_{CONVECTION}^F = 1ST\text{-}UPWIND \quad (14)$$

where the term "1ST-UPWIND" indicates the use of the first-order upwind scheme.

Lastly, the output of the computational solution is specified as $$T_{OUTPUT}^F = \{t_E^F\} \quad (15)$$

This statement means that the computational solution at the computation end time will be outputted.

Figure 6:
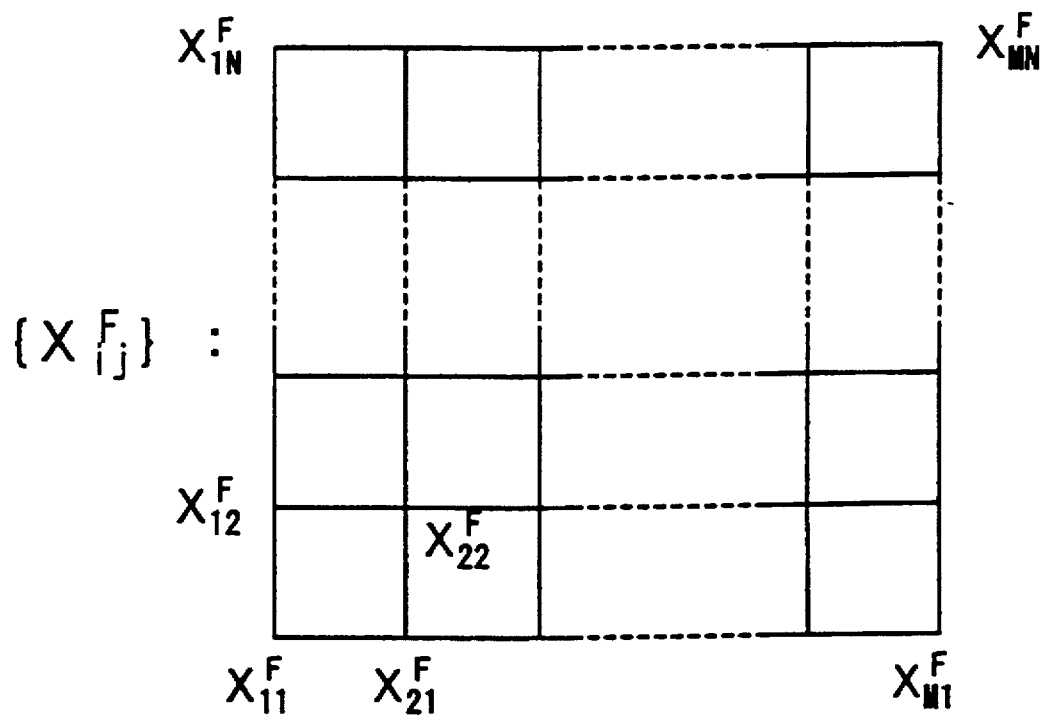
FIG. 6 is a diagram showing discrete grids in a computational domain.

FIG. 6 is a diagram showing grids in the given computational domain. The coordinates $X_{ij}$ for the M×N grids points are defined as shown in FIG. 6.

Under the analyzing conditions as described above, the fluid flow analyzing unit 37 in FIG. 4 calculates the flow field data 31 based on the primitive equations, i.e., Equations (2) and (3). When the fluid is non-compressive, Equation (3) representing the conservation law of momentum is specialized as $$\frac{\partial}{\partial t}(\rho u^i) + \nabla \cdot (u \rho u^i) = -\nabla P + \mu \nabla^2 u^i \quad (16)$$

This equation is called the Navier-Stokes equation, where $\mu$ is the viscosity coefficient. The flow velocity vector has three components in the three-dimensional system, or two components in the two-dimensional system. A superscript "i" is used in Equation (16) to indicate each component of the vector.

Equation (16) is then converted (or discretized) to a difference equation, in which the time and spatial derivatives are replaced with finite difference expressions. The time derivative is discretized with the Euler's explicit method. Discretization of the spatial derivatives involves a term called "advective term" (or "convective term"), which represents an effect of transport of some substance by the fluid flow. The first-order upwind differencing scheme is used here for the discretization of the advective term.

The flow velocity at every grid point will be calculated and updated at every time step, and the final flow field data obtained at the computation end time will be outputted.

Figure 7A:
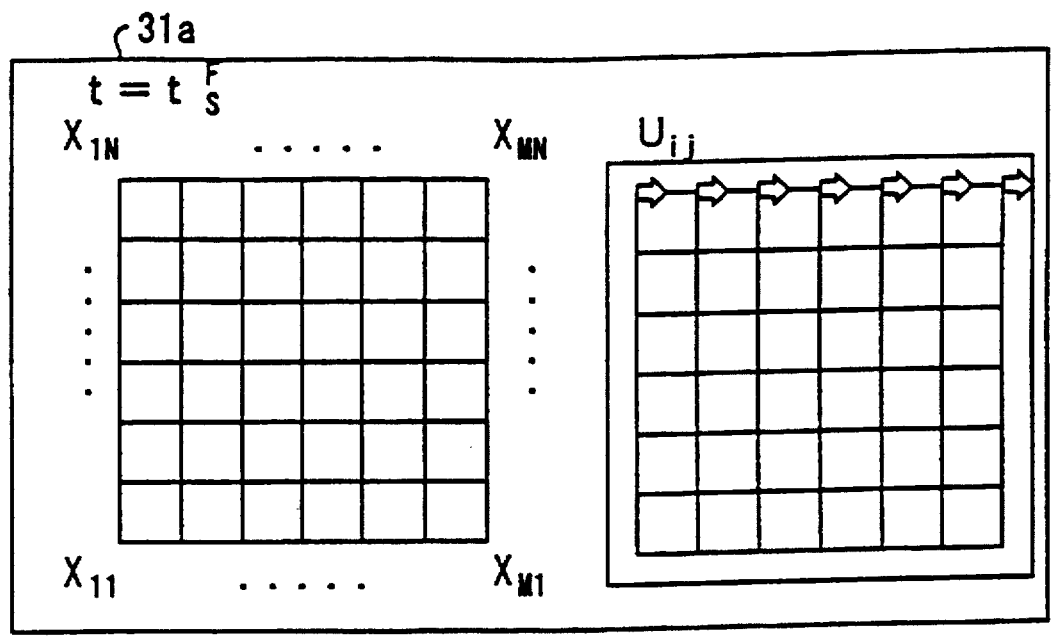
FIGS. 7(A) and 7(B) are diagrams showing flow field data.
Figure 7B:
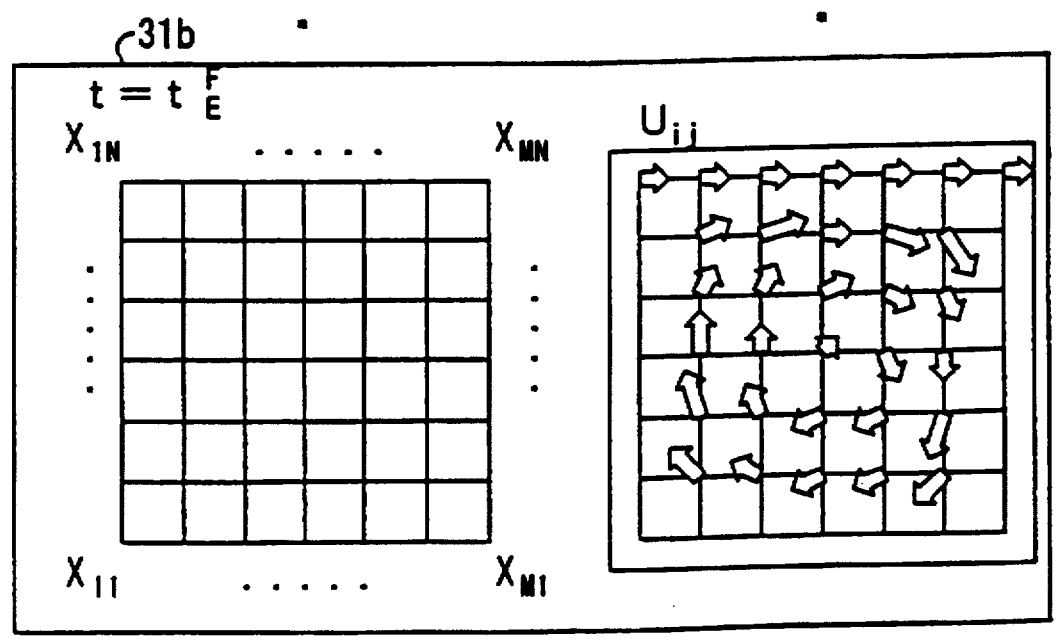

FIGS. 7(A) and 7(B) are diagrams showing the flow field data at the computation start time and at the computation end time, respectively. The flow field data at each point of time contains the grid coordinates and values of the velocity vectors at the respective grid points. Arrows shown in FIGS. 7(A) and 7(B) represent the flow velocity vectors. The position of each arrow indicates the definition point of each fluid flow, and its direction and length represent the direction and strength of the fluid flow.

The flow field data 31a at the computation start time shows that the fluid at grid point $X_{im}$ flows in the right direction. The other flow field data 31b at the computation end time exhibits the fluid flow produced at other grid points. This flow field data 31b will be solely outputted as the final computational solution.

On the other hand, the analyzing condition translator 36 generates the virtual substance analyzing conditions 32 translating from the fluid flow analyzing conditions 35. The translation is performed under the following rules as $$\frac{\partial C_{ij}}{\partial x}\bigg|_a = 0 \text{ if } \frac{\partial U_{ij}}{\partial x}\bigg|_a = 0 \quad (17)$$

$$C_{ij}|_a = 1 \text{ if } U_{ij}|_a = (U_\infty, V_0) \quad (18)$$

$$C_{ij}(T_s^C) = 1 \quad (19)$$

$$T_s^C = T_s^F \quad (20)$$

$$T_E^C = T_E^F \quad (21)$$

$$\Delta T^C = \Delta T^F \quad (22)$$

$$TH_{INTEGRAL}^C = \begin{cases} EULER & \text{if } TH_{INTEGRAL}^F = EULER \\ \text{Adams-Bashforce} & \text{if } TH_{INTEGRAL}^F = \text{Adams-Bashforce} \end{cases} \quad (23)$$

$$TH_{CONVECTION}^C = \quad (24)$$

$$\begin{cases} 1ST\text{-}UPWIND & \text{if } TH_{CONVECTION}^F = 1ST\text{-}UPWIND \\ 2ND\text{-}CENTRAL & \text{if } TH_{CONVECTION}^F = 2ND\text{-}CENTRAL \\ 1ST\text{-}UPWIND & \text{if } TH_{CONVECTION}^F = 3ST\text{-}UPWIND \end{cases}$$

$$T_{OUTPUT}^C = \left\{ T_E^F, \frac{1}{2}(T_s^F + T_E^C) \right\} \quad (25)$$

-continued $$X_{ij}^C = X_{ij}^F \quad (26)$$

Equation (17) designates a relationship in the boundary conditions between the fluid flow analyzing conditions 35 and the virtual substance analyzing conditions 32. That is, if the spatial variation of the flow velocity is zero, that of the virtual substance concentration should also be zero.

Equation (18) designates that if a constant flow velocity is given at certain boundary points the concentration values of the virtual substance should be set to "1" at those points.

Equation (19) specifies that the concentration values at the computation start time should be set to "1" at every grid point.

Equations (20) to (22) states that the computation start time, computation end time, and time step are all the same as those in the fluid flow analyzing conditions.

Equation (23) relates to the selection of time integral scheme. If the fluid flow analyzing conditions designate the Euler's explicit method, the virtual substance analyzing conditions should take the same Euler's explicit method. Similarly, if the Adams-Bashforce method is selected for the flow field analysis, then the same method should be used for the virtual substance analysis.

Equation (24) relates to the selection of differencing scheme for the advective term. If the fluid flow analyzing conditions designate the first-order upwind scheme, the virtual substance analyzing conditions should take the same first-order upwind scheme. Similarly, if the second-order central scheme is selected for the flow field analysis, then the same method should be used for the virtual substance analysis. However, even if the third-order upwind scheme is selected for the flow field analysis, the first-order upwind scheme should be used for the virtual substance analysis.

Equation (25) states that the virtual substance advection solution should be outputted at the middle of the computation start time and end time and at the computation end time and.

Equation (26) specifies the grid coordinates to be the same as those defined in the fluid flow analyzing conditions.

The following description will now present the virtual substance analyzing conditions 32 that are generated by the analyzing condition translator 36 in FIG. 4 under the above-stated translation conditions.

Figure 8:
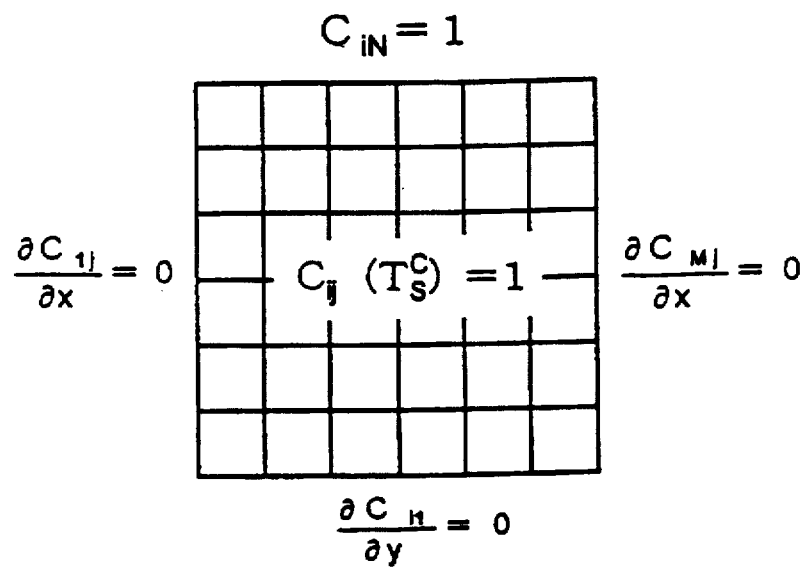
FIG. 8 is a diagram showing boundary conditions and initial conditions included in the virtual substance analyzing conditions.

FIG. 8 is a diagram showing the boundary and initial conditions included in the virtual substance analyzing condition.

The initial value of the concentration C is set as $$C_{ij}(T_s^C)=1 \quad (27)$$

This initial condition means that the concentration value at every interior grid point is "1" at the computation start time.

The boundary conditions are given as $$\frac{\partial C_{1j}}{\partial x} = 0 \quad (28)$$

$$\frac{\partial C_{i1}}{\partial y} = 0 \quad (29)$$

$$\frac{\partial C_{Mj}}{\partial x} = 0 \quad (30)$$

$$C_{iN} = 1 \quad (31)$$

The first three equations indicate that the spatial gradient of the concentration $C_{1j}$ at every first grid in the X-axis direction, the concentration $C_{Mj}$ at every M-th grid in the X-axis direction, and the concentration $C_{i1}$ at every first grid in the Y-axis direction are all zero. Equation (31) indicates that a constant value "1" is given as the concentration $C_{iN}$ at every N-th grid in the Y-axis direction.

The computation start time, computation end time, and time step are defined as $$T_S^C = t_S^C \quad (32)$$

$$T_E^C = t_E^C \quad (33)$$

$$\Delta T^C = \Delta t^C \quad (34)$$

Further, the time integral scheme is set as $$TH_{INTEGRAL}^C = EULER \quad (35)$$

which indicates that the Euler's explicit method should be used.

The differencing scheme for the advective term is selected as $$TH_{CONVECTION}^C = 1ST\text{-}UPWIND \quad (36)$$

which indicates the use of the first-order upwind scheme.

Lastly, the output of the computational solutions is instructed as $$T_{OUTPUT}^C = \left\{ \frac{1}{2} (t_S^C + t_E^C), t_E^C \right\} \quad (37)$$

This statement specifies that the solutions should be outputted at the middle of the computation start time and end time, as well as at the computation end time.

As to the M×N grid coordinate definition for the virtual substance advection analysis, the values in FIG. 6 previously defined as part of the fluid flow analyzing conditions will be used as they are.

Under the analyzing conditions as described above, the virtual substance advection calculator 33 in FIG. 4 carries out the advection computation for the virtual substance. This computation will yield the variation of the virtual substance concentration with the passage of time in the situation that the virtual substance is mixed in the fluid whose behavior is given by the flow field data 31. Under the assumption that the virtual substance fluid will never diffuse, the variation of the virtual substance concentration with time is expressed by Equation (1).

In comparison with Equation of continuity (2) representing the conservation law of mass, it is easily understood that Equation (1) is obtained from Equation (2) by replacing the variable π for the fluid density with ρC for the density of the virtual substance. In other words, Equation (1) represents the conservation law of mass for the virtual substance.

Figure 9A:
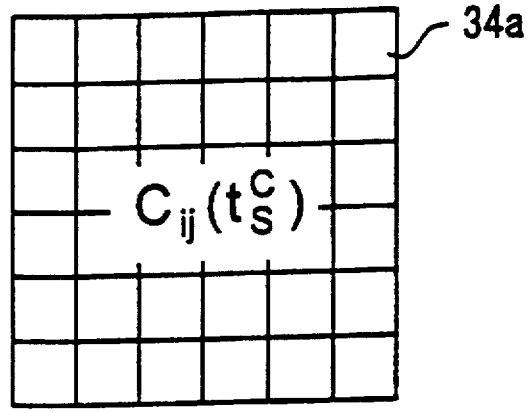
FIGS. 9(A), 9(B), and 9(C) are diagrams showing some solutions of advection computation for the virtual substance.
Figure 9B:
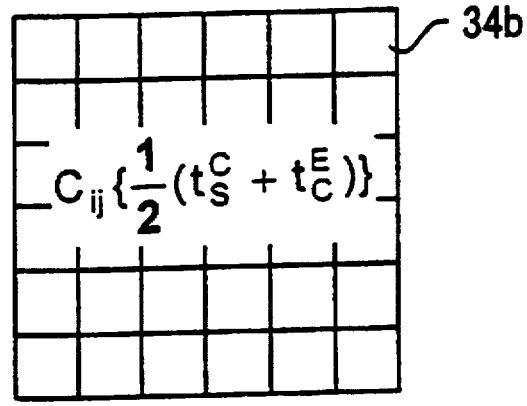
Figure 9C:
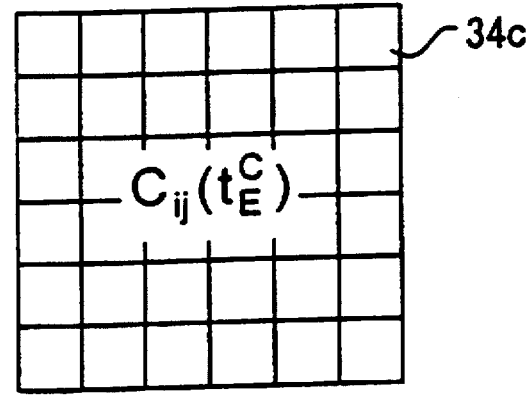

By solving Equation (1), the concentration value of the virtual substance at each grid will be obtained at every time step. FIGS. 9(A), 9(B), and 9(C) are the virtual substance advection solutions, respectively showing the views at the computation start time, middle time, and end time.

A first virtual substance advection solution 34a at the computation start time shows the concentration values of the virtual substance provided by the initial conditions. A second virtual substance advection solution 34b shows the state of the concentration at the middle time, and a third virtual substance advection solution 34c shows that at the computation end time. Of three solutions, the last two will be actually outputted as the virtual substance advection solution 34.

The following description will explain how the errors in the flow field data are estimated from the virtual substance advection solution. Note that the processes to be described below has been performed by the computational fluid dynamics analyzer shown in FIG. 4.

Figure 10:
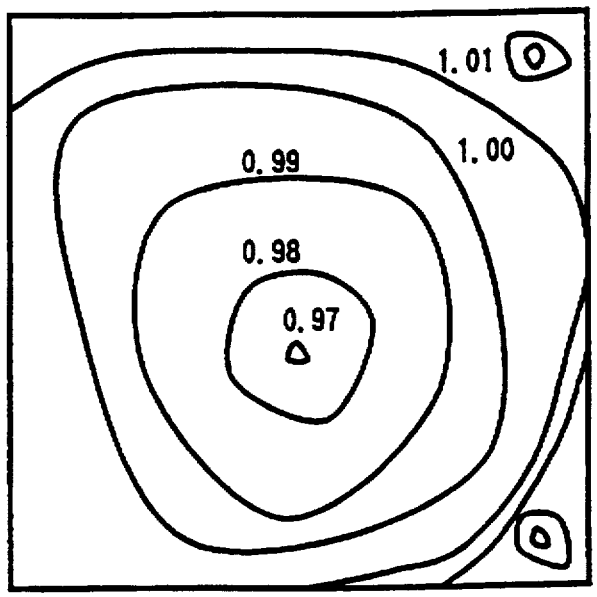
FIG. 10 is a diagram that shows a first example screen displaying a solution of the advection computation for the virtual substance.

FIG. 10 is a diagram that shows a first example view demonstrating the solution of advection computation of the virtual substance, which is actually displayed on a CRT screen or the like. This example represents in the form of contour map the two-dimensional concentration distribution of the virtual substance enclosed in the given square region, in which figures affixed to the contour lines indicate the concentration values of the virtual substance. This solution has been obtained from the flow field data 31, which is supplied to the analyzer as unsteady flow data updated at every 0.01 unit time.

The fluid flow analyzing conditions 35 that were used to obtain the flow field data 31 are as follows. The initial flow velocity, the initial pressure value relative to static pressure, and other initial conditions were all set to zero. No pressure gradient was assumed in the boundary conditions. As to the boundary conditions of the flow velocity, no slip was assumed on any of four sides of the square region, and a constant flow velocity "1" pointing in the right direction was only given at the top side of the region. The Reynolds number "1000" was given to the fluid as one of its properties. Regarding the grid setting for the computational domain, each side having the length "1" was divided into 50 segments. The Euler's explicit method was used for time integration, and the second-order central scheme was selected for differencing the advective term. The computation was done from time "0" to "50" with the time step of "0.01."

The fluid flow analyzing unit solved the unsteady problem under the above-described conditions and outputted the flow field data 31 at each time step in the form of data arrays accessible in the program.

The virtual substance analyzing conditions 32 provided in this case are as follows. The initial concentration values of the virtual substance were uniformly set to "1" and no boundary condition was specified. Regarding the grid setting, each side of the computational domain, having the length "1," was divided into 50 segments. The Euler's explicit method was used for time integration, and the second-order central scheme was selected for differencing the advective term. The computation was scheduled from time "0" to "50" with the time step of "0.01."

The virtual substance advection calculator 33 solved the unsteady problem under the above-described conditions and yielded the concentration data of the virtual substance at the time "50" as the final output. FIG. 10 shows this final output graphically.

Now assume here that the flow field is defined as the field of non-compressive fluid. Then the obtained flow field data should not exhibit any change in the concentration values of the virtual substance, but must show the constant value "1" at every grid point. In FIG. 10, however, the obtained solution of the virtual substance advection exhibits a variation of three percent at the worst point. This data suggests that the virtual substance transported by the fluid flow indicates some non-conservativeness of at most three percent. In other words, the flow field data involves a violation of the conservation law of mass by three percent at most.

In the way described above, the violation of the conservation law involved in the flow field data can be obtained quantitatively. Also, the visual presentation of the data in the form of contour map helps the operator to estimate the errors in the flow field data.

Figure 11:
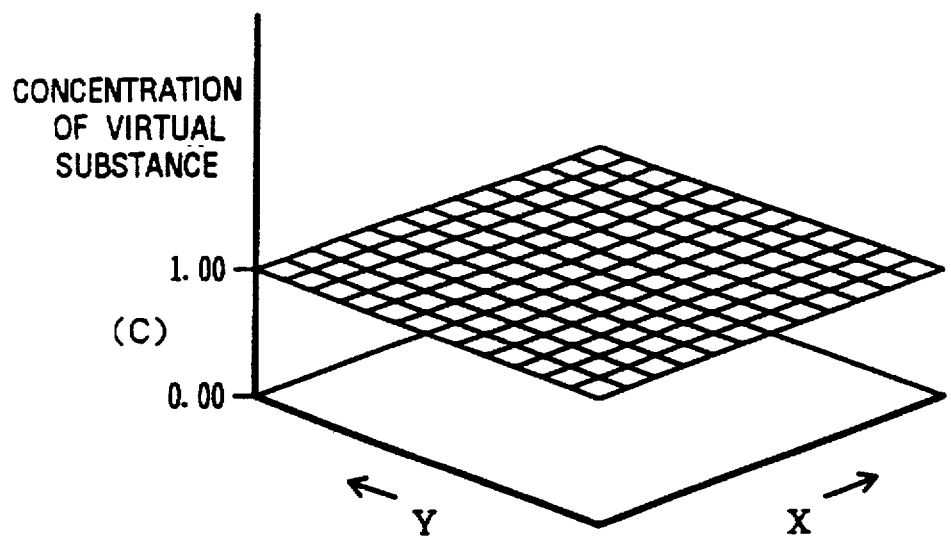
FIG. 11 is a diagram that shows a second example screen displaying a solution of the advection calculation for the virtual substance.

The estimation will become more comprehensive by displaying the virtual substance advection solution in a three-dimensional view. FIG. 11 shows a second example screen demonstrating the virtual substance advection solution, in which the concentration values are plotted in the vertical direction on the respective grid points of the X-Y plane, thus making a curved surface to show the concentration data.

The advection solution shown in FIG. 11 indicates that the flow field data contains little error. As such, when the curved surface representing the concentration distribution is close to a flat plane, the flow field data is regarded as being accurate. In contrast to this, if the curved surface exhibits some peaks or troughs, then the flow field data is not accurate and the height of the peaks or the depth of the troughs will suggest the magnitude of the errors.

The visual presentation of the virtual substance advection solution will ease the estimation of the error. Now assume that there are provided two sets of the flow field data; one is very accurate but the other is inaccurate. In the prior art, however, it is nearly impossible to quantify their correctness, and therefore, the operator is unable to judge which one is a result of more precise analysis, by only comparing the two flow field data sets. As opposed to this, the method of the present invention carries out the advection computation using the flow field data in combination with the virtual substance analyzing conditions, and then graphically displays its solution in a three-dimensional view. Such structural arrangement will enable the operator to decide which data satisfies better the conservation law quite easily and also quantitatively.

Incidentally, as a minimum configuration, it is not always necessary to visualize the virtual substance advection solution, but it is rather acceptable to provide only essential information such as the variation from the initial value or the maximum value of the concentration of the virtual substance.

In addition, the three-dimensional view of the flow field data as shown in FIG. 11 may not be always required. The flow field data can be stored in a numerical data file in magnetic media or an array of variables in the program to interface with the virtual substance advection calculator.

The present invention provides a tool for assessment of the reality of the flow field data obtained from the fluid flow analysis, which only require a calculation of the advection of the virtual substance based on the obtained flow field data. This tool will perfectly eliminate troublesome and difficult work to define and examine error evaluation functions for each modeling scheme and to estimate a computation error for each program step.

The present invention also allows a quantitative comparison between the initial concentration value as part of the virtual substance analyzing conditions and the calculated solution of the virtual substance advection. It is thus possible to quantify to what extent the conservation law of mass is violated in the obtained flow field data. It will also assist the operator to find a method of fluid dynamics analysis optimal to the subject of numerical experiments.

Further, the advection computation for the virtual substance can be performed with the same discretization method and the same computation model as those used to obtain the flow field data. This configuration keeps the advection computation free from the modeling errors and computation errors, thus enabling accurate error evaluation.

Still further, the analyzing condition translator reduces the time and labor required to set up the virtual substance analyzing conditions by partly or totally deriving them from the fluid flow analyzing conditions.

To summarize the above, the present invention makes it possible to evaluate each method of computational fluid dynamics analysis quantitatively, provides more precise solutions, and serves as a better support tool in design and development of various machines, devices, equipment, etc. Reduction in the design cost and development time to be achieved the present invention will greatly contribute to the advancement of industries.

Figure 12:
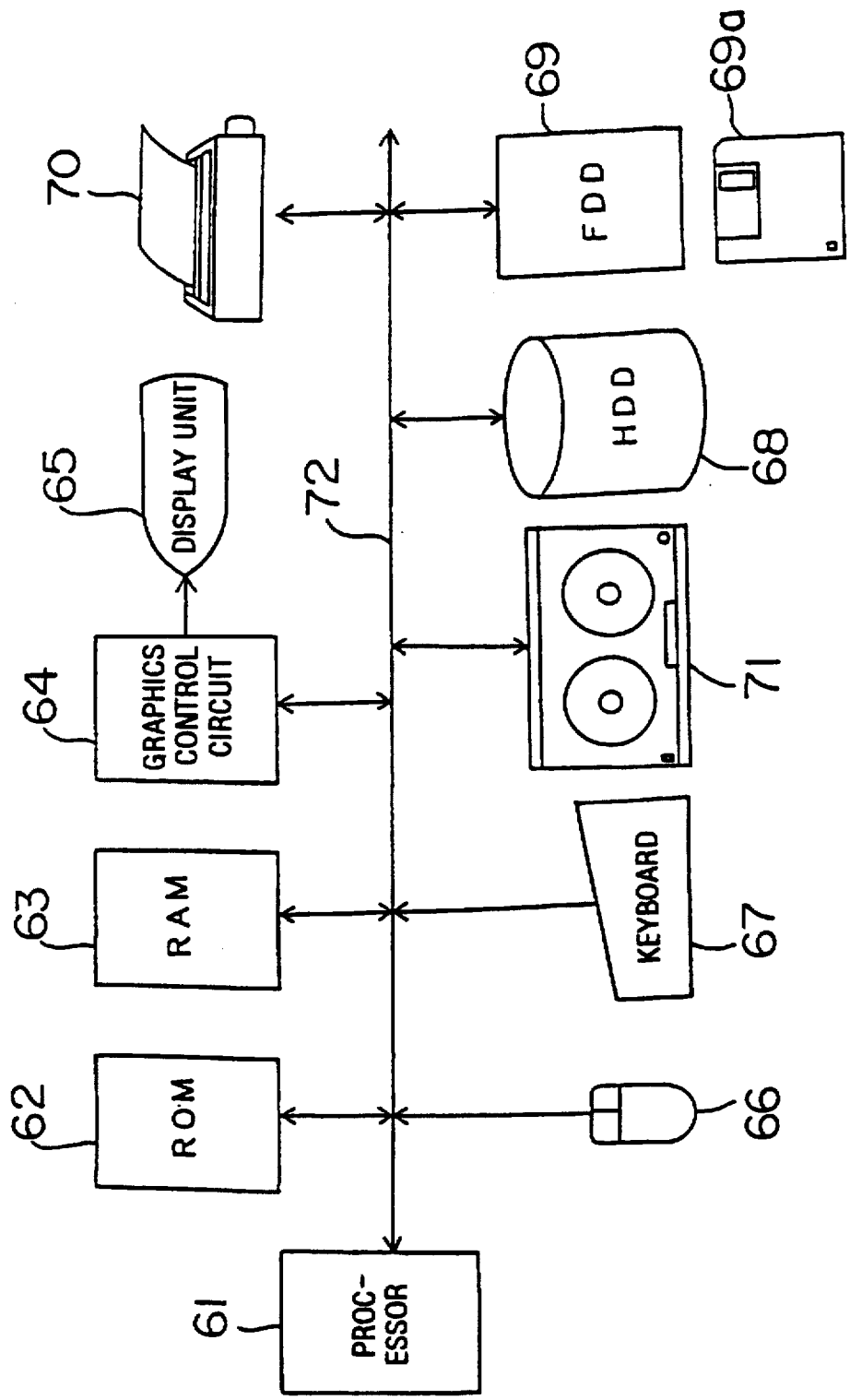
FIG. 12 is a hardware block diagram showing a workstation that performs the computational fluid dynamic analysis and error estimation.

Next, an overview of hardware for the computational fluid dynamics analysis and error estimation will be provided below. FIG. 12 is a hardware block diagram showing a workstation for those purposes.

The workstation is constituted by a processor 61, a graphics control circuit 64 and a display unit 65, a mouse 66, a keyboard 67, a hard disk unit (HDD) 68, a floppy disk unit (FDD) 69, a printer unit 70, and a magnetic tape unit 71, which are interconnected with a bus 72.

The processor 61 totally supervises the workstation. The read only memory (ROM) 62 stores programs necessary for starting up the system, and the programs for fluid dynamics analysis and advection computation are loaded in the main memory (RAM) 63.

The graphics control circuit 64 contains a video memory and converts the virtual substance advection solution to video signals to drive the display unit 65 for visual presentation. The mouse 66 is used as a pointing device to move a mouse pointer and select an icon or menu item.

The hard disk unit 68 stores system programs, and the various programs for fluid dynamic analysis and advection computation, which are downloaded into the main memory 63. The hard disk unit 68 also stores the flow field data and virtual substance advection solution data on demand.

The floppy disk unit 69 is used to load the fluid flow analyzing conditions and other necessary data from a floppy disk 69a or, in turn, to save them on demand.

The printer unit 70 prints out the obtained virtual substance advection solution. The magnetic tape unit 71 is used to save the flow field data and/or the virtual substance advection solution data, when required.

The workstation can be replaced with a high-performance personal computer or a general purpose computer.

The above discussion will be summarized as follows. In the method of and apparatus for estimating the error in computational fluid dynamics analysis according to the present invention, an advection computation is performed assuming that a virtually non-diffusible substance (i.e., virtual substance) is mixed in the fluid whose behavior is given by flow field data obtained through a fluid flow analysis. Concentration data for the virtual substance is thus produced as the result of the advection computation. Comparison of this concentration data with its initial value before advection will make it possible to quantify how the conservation law is violated in the obtained flow field data.

Further, in the method of and apparatus for computational fluid dynamic analysis according to the present invention, flow field data is first obtained through a fluid flow analysis and then an advection computation is performed assuming that a virtually non-diffusible substance (i.e., virtual substance) is mixed in the fluid whose behavior is given by the obtained flow field data. By using the concentration data for the virtual substance produced through the advection computation, the accuracy of the analysis can be quantitatively evaluated. In addition, the present invention allows the result of the fluid flow analysis to be easily transferred for use in the advection computation, thus improving the efficiency of the analyzing process.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method of estimating errors in flow field data obtained using a computational fluid dynamics analysis that numerically simulates behavior of heat and/or fluid, comprising the steps of:

computing advection of a virtual substance in a flow field represented by the flow field data, the virtual substance being an imaginary substance having a substantially zero diffusion coefficient, a predetermined initial concentration value and which has no effect on the flow field when mixed with the fluid in the flow field;

obtaining concentration data of the virtual substance given by the advection computation; and estimating the errors in the flow field data by evaluating variations in concentration values that the concentration data exhibits in comparison with the predetermined initial concentration value.

2. An apparatus for estimating errors in flow field data obtained using a computational fluid dynamics analysis that numerically simulates behavior of heat and/or fluid, said apparatus comprising:

virtual substance advection calculation means for obtaining concentration data of a virtual substance by computing advection of a virtual substance in a flow field represented by the flow field data, the virtual substance being an imaginary substance having a substantially zero diffusion coefficient, a predetermined initial concentration value and which has no effect on the flow field when mixed with the fluid in the flow field; and error estimation means for estimating the errors in the flow field data by evaluating variations in concentration values that the concentration data exhibits in comparison with the predetermined initial concentration value.

3. An apparatus according to claim 2, further comprising analyzing condition translation means for generating a part of or all of virtual substance analyzing conditions, to be used by said virtual substance advection calculating means, based on fluid flow analyzing conditions used in the computational fluid dynamic analysis to obtain said flow field data.

4. An apparatus according to claim 2, further comprising display means for providing a visual presentation of the concentration value of said virtual substance at various grid points, based on said concentration data obtained by said virtual substance advection calculation means.

5. A method of a computational fluid dynamics analysis that numerically simulates behavior of heat and/or fluid, comprising the steps of:

calculating flow field data through a fluid dynamics analysis under predetermined fluid flow analyzing conditions;

computing advection of a virtual substance in a flow field represented by the flow field data, the virtual substance being an imaginary substance having a substantially zero diffusion coefficient, a predetermined initial concentration value and which has no effect on the flow field when mixed with the fluid in the flow field;

obtaining concentration data of the virtual substance given by the advection computation; and estimating errors in the flow field data based on variations in a concentration value of said virtual substance by evaluating the variations in concentration values that the concentration data exhibits in comparison with the predetermined initial concentration value of the virtual substance.

6. An apparatus for performing a computational fluid dynamics analysis that numerically simulates behavior of heat and/or fluid, the apparatus comprising:

fluid dynamics analyzing means for calculating flow field data through a fluid dynamics analysis under predetermined fluid flow analyzing conditions;

virtual substance advection calculation means for obtaining concentration data of a virtual substance by computing advection of a virtual substance in a flow field represented by the flow field data, the virtual substance being an imaginary substance having a substantially zero diffusion coefficient, a predetermined initial concentration value and which has no effect on the flow field when mixed with the fluid in the flow field; and error estimation means for estimating the errors in the flow field data by evaluating variations in concentration values that the concentration data exhibits in comparison with the predetermined initial concentration value.

7. An apparatus according to claim 6, further comprising analyzing condition translation means for generating a part of or all of virtual substance analyzing conditions, to be used by said virtual substance advection calculation means, based on fluid flow analyzing conditions used by said fluid dynamics analyzing means to obtain said flow field data.

8. An apparatus according to claim 6, further comprising display means for providing a visual presentation of the concentration value of said virtual substance at various grid points, based on said concentration data obtained by said virtual substance advection calculation means.

* * * * *

UNITED STATES PATENT AND TRADEMARK OFFICE
CERTIFICATE OF CORRECTION

PATENT NO. : 5,801,969
DATED : September 1, 1998
INVENTOR(S) : Nagahama

It is certified that error appears in the above-indentified patent and that said Letters Patent is hereby corrected as shown below:

Col. 8, line 14, delete "a";
line 20, delete "a".

Col. 12, line 48, change "$\pi$" to --$\rho$--.

Col. 16, line 17, START A NEW PARAGRAPH with "obtaining".

Signed and Sealed this

Ninth Day of February, 1999

Attest:

Attesting Officer

*Acting Commissioner of Patents and Trademarks*